May 24, 1949.　　　　　E. D. HANSON　　　　　2,471,212
ROTARY TURBINE TYPE FLUID COUPLING

Filed April 5, 1946　　　　　　　　　　　　　2 Sheets-Sheet 1

Inventor
ESTYLE D. HANSON,
By Henninger and Pillars
Attorney

May 24, 1949.  E. D. HANSON  2,471,212
ROTARY TURBINE TYPE FLUID COUPLING
Filed April 5, 1946  2 Sheets-Sheet 2

Inventor
ESTYLE D. HANSON,
By Henninger and Pillate
Attorney

Patented May 24, 1949

2,471,212

UNITED STATES PATENT OFFICE 2,471,212

ROTARY TURBINE TYPE FLUID COUPLING

Estyle D. Hanson, Baltimore, Md.

Application April 5, 1946, Serial No. 659,912

4 Claims. (Cl. 60—54)

The present invention relates to improvements in variable torque drives for reels such as are used in the winding or reeling of paper, cloth, wire, rope, and like materials under tension.

The invention is designed with the principal object in view of providing a power drive automatically variable in operation as the diameter of the roll being wound increases to maintain a uniform tension at all times on the material being wound.

Another object of the invention is to provide a clutch or coupling of the fluid type wherein the driving torque may be varied in accordance with the quantity of liquid supplied to the fluid coupling.

Other and further objects of the invention are also comprehended as will be readily apparent when the following description and claims are read with reference to the drawings accompanying and forming a part of the present application.

In the drawings:

Fig. 4 is an enlarged fragmentary view of a portion of the clutch casing and the vanes carried thereby.

Fig. 5 is a perspective view of an annular runner core and the vanes thereof forming another part of the fluid coupling.

Figure 1:
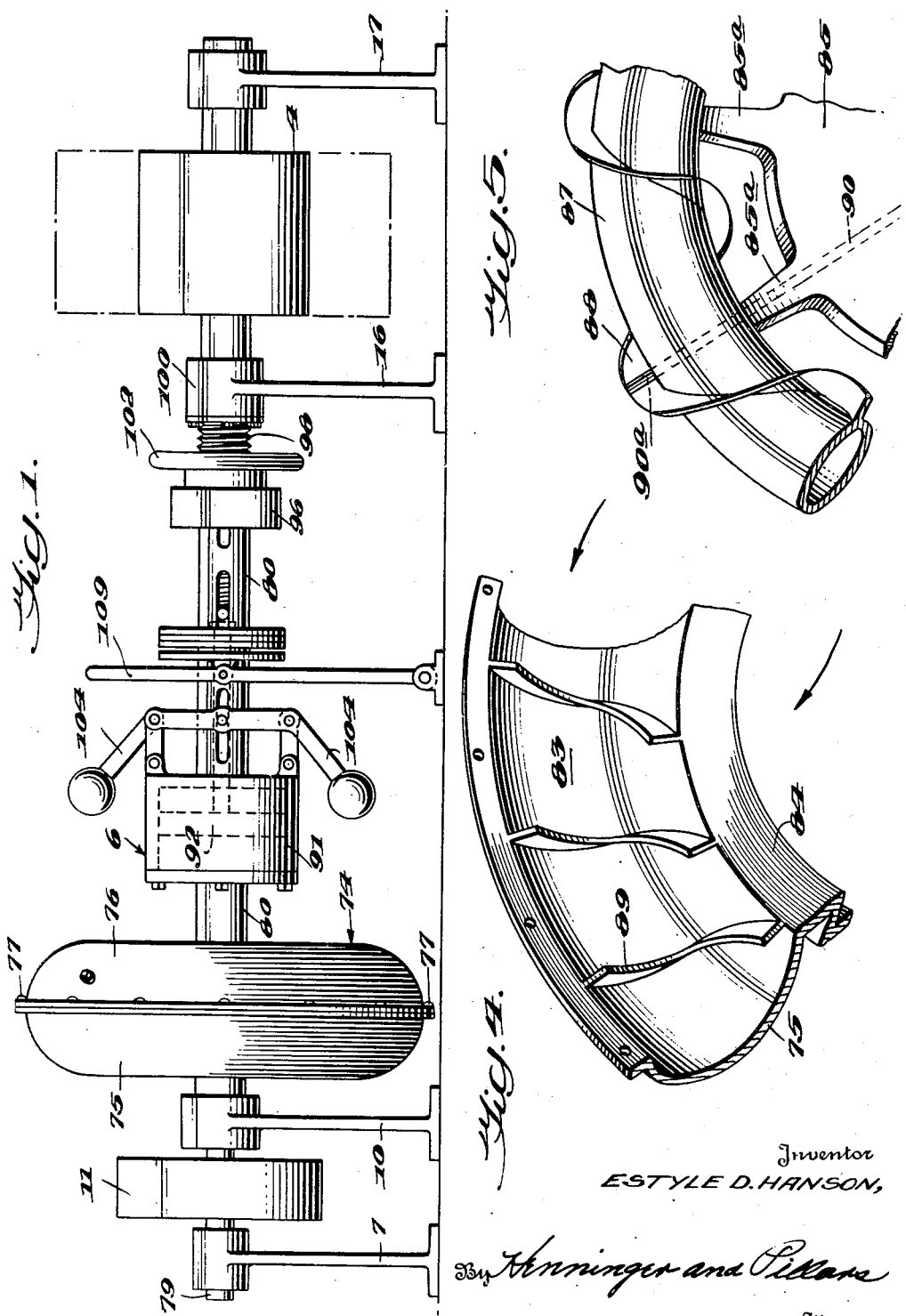
Fig. 1 is a view in side elevation illustrating a variable torque drive embodying the invention.

Referring to the drawings, my improved drive comprises as its basic elements a drive shaft 79, a hollow driven shaft 80 having a reel 4 thereon, a fluid torque transmitting clutch 74 and a governor operated clutch control unit 6. It will be noted that the shaft 79 and the shaft 80 are in horizontal alignment.

Figure 2:
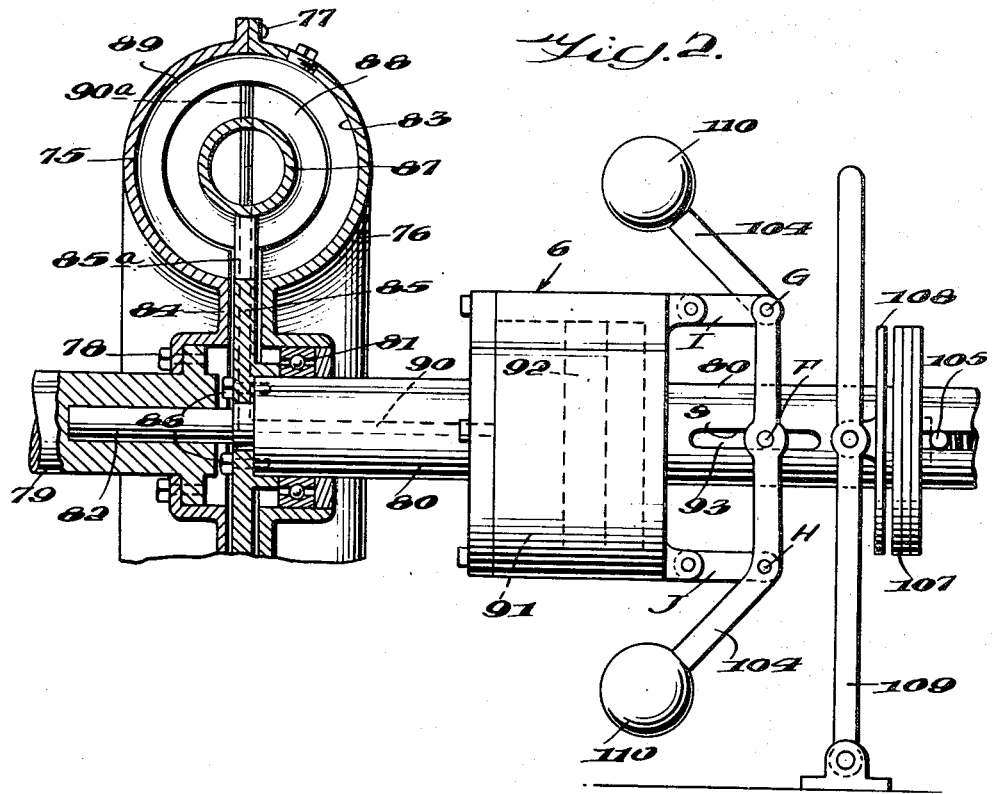
Fig. 2 is an enlarged fragmentary view showing the fluid coupling partly in section.

The drive shaft 79 is journalled at one end in a bearing bracket 7 with its other end journalled in a bearing bracket 10. A pulley 11 is secured to the drive shaft 79 between the bearing brackets 7 and 10. One end of the driven shaft 80 is supported on the drive shaft 79 and for this purpose, the driven shaft has a reduced end 82 journalled in one end of the drive shaft 79 as shown in Fig. 2. The driven shaft 80 carries at its opposite end the reel 4. This portion of the shaft 80 is journalled adjacent opposite ends of the reel 4 by a pair of bearing brackets 16 and 17 and the reel 4 is suitably secured to the driven shaft intermediate the brackets 16 and 17.

The fluid coupling or clutch represented generally at 74 includes complementary casing sections 75 and 76 bolted together at 77. The casing section 75 is bolted at 78 to the driving shaft 79 whereas the other casing section 76 rotates about the driven shaft 80 on an anti-friction bearing assembly 81. The casing sections 75 and 76 form a circular circumferential fluid chamber 83 and having a hollow intermediate web portion 84 as shown in Fig. 2. A disc 85 surrounds the reduced end portion 82 of the driven shaft 80 within the hollow web 84 and the disc 85 is bolted to the driven shaft 80 by means of cap screws 86 or the like. The disc 85 supports an annular core 87 within the chamber 83 by means of a plurality of spoke-like arms 85a. The annular core 87 forms a part of the runner unit and another part thereof is a spiral vane 88 which surrounds the core 87 and is attached thereto.

The casing section 75 carries similar helical vanes 89 which surround the helical vane 88. These helical vanes 89 are adapted to straddle the disc 85 and the spoke-like arms 85a as will be evident from a consideration of Fig. 2. It will be further observed that the helical vanes 89 slope in one direction while the helical vane 88 spirals in an opposite direction. The inner edges of the helical vanes 89 closely surround the outer peripheral edge of the helical vane 88.

The control means 6 for the fluid coupling includes a fluid pressure cylinder 91 interposed in the driven shaft 80 and forming a part thereof. A piston 92 is mounted for reciprocating movement within the cylinder 91 and is operated by a governor mechanism so as to be advanced and retracted within the cylinder 91. A channel 90 leads from the fluid pressure cylinder 91 through the shaft 80 and through the disc 85 and through one or more of the spoke-like arms 85a and through the core 87 terminating in a pipe 90a adjacent the outer edge of the helical vane 88 so as to thereby provide communication between the cylinder 91 and the chamber 83. The cylinder 91 is filled with a suitable quantity of fluid such as oil whereby this liquid is forced from the cylinder 91 into the chamber 83 and withdrawn from the fluid coupling into the cylinder 91 in accordance with the speed of the driven shaft 80. The liquid is accordingly supplied to the fluid coupling in quantity so as to increase or diminish the supply thereto and accordingly vary the torque transmitted from the impeller formed by the casing section 75 and the vane 89 to the runner formed by the vane 88, the core 87, and the disc 85.

Figure 3:
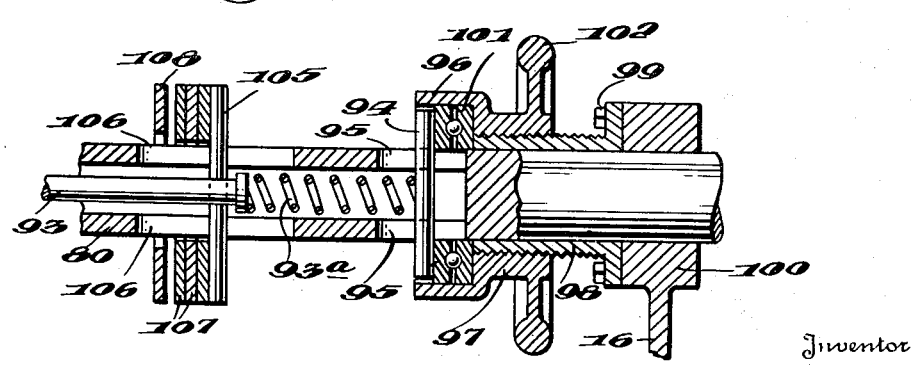
Fig. 3 is a sectional view of means for adjusting the control mechanism.

Referring to Figs. 2 and 3, a piston rod 93 is attached to the piston 92 and is normally advanced by a coil spring 93a towards the channel opening 90. The piston rod 93 and the coil spring 93a are arranged within the hollow driven shaft 80. One end of the spring 93a is connected to one end of the piston rod 93 whereas the other end of the spring is connected to a variable tensioning device comprising a transverse pin 94 extending through slots 95 in a driven shaft 80. The ends of the transverse pin 94 are disposed in an enlarged annular end 96 of a sleeve 97 which is threaded on a fixed sleeve 98. The sleeve 98 is secured to a bearing 100 by means of cap screws 99. The bearing 100 is supported by the pedestal 16.

An anti-friction bearing unit 101 is provided in the enlarged end 96 of the sleeve 97. One of the race members of the anti-friction bearing supports the pin 94 so that this pin may revolve with the shaft 80 within the enlarged annular end 96 of the sleeve 97. Thus by turning the sleeve 97 on the sleeve 98, the force exerted on the spring 93a and the piston rod 93 may be varied. The sleeve 97 may be rotated by means of a hand wheel 102.

The control unit includes a governor having a plurality of weights 110 adapted to be influenced by centrifugal force. These weights or balls are supported by two ball-carrying governor arms 104 which act to retract the piston rod 93 and the piston 92 to the right in Figs. 1 and 2. As shown in Fig. 2, the upper arm 104 is pivoted at H to a link J and at F to the piston rod 93. The lower arm 104 is pivoted at F to the piston rod 93 and at G to a link I. The pivot pin F extends through the piston rod 93 and is adapted to slide in diametrically arranged slots S provided in the driven shaft 80.

A pin 105 extends through the piston rod 93 and through slots 106 in the driven shaft 80. A plurality of brake discs 107 are secured to the shaft 80 adjacent the pin 105 and are urged forwardly with the piston rod 93 by the spring 93a. The brake assembly includes a disc 108 actuated by a suitable brake lever 109 as shown in Fig. 2. This brake mechanism serves as means for stopping rotation of the driven shaft 80 at will such as when it is desired to remove a roll of wound material from the reel 4 and to start another winding operation.

In operation of the apparatus forming the invention it is understood that the clutch casing includes some liquid and that the cylinder 91 is substantially filled with heavy fluid such as oil. As the driving shaft 79 is rotated, the casing section 75 and the helical vanes 89 are rotated and the runner formed by the vane 88 and the core 87 drives the shaft 80 through the disc 85 since there is then some liquid within the chamber 83 to provide a driving connection between the impeller and the runner assembly. The driven shaft 80 accordingly rotates to turn the reel 4 so as to initiate the winding operation. As the runner unit picks up speed, the weights 110 of the control mechanism move outwardly in response to centrifugal force and urge the piston 92 to the right in Figs. 1 and 2 and thereby withdraws liquid from the chamber 83 through the passage 90 into the cylinder 91 so as to impair the fluid coupling between the helical vanes 89 and the helical vane 88. As the diameter of the roll being wound increases, the load on the driven shaft 80 increases and tends to slow down the speed of the driven shaft 80 whereupon the weights 110 are retracted as a result of the decreased centrifugal force acting thereon so as to move the piston 92 towards the left in Fig. 2. Such movement of the piston 92 forces additional liquid into the chamber 83 and thereby increases the volume of liquid within the fluid coupling. Thus the driving torque is increased so that tension on the material being wound is maintained uniformly throughout the winding operation.

The foregoing is believed to impart a clear understanding of my invention without further explanation. It is understood, however, that the invention as shown and described is susceptible of modification and the right is reserved to all modifications falling within the scope of the appended claims.

I claim:

1. In a fluid coupling, a drive shaft, a driven shaft aligned with the drive shaft, an annular casing secured to the drive shaft, a helical vane carried by the casing and arranged on the inner surface thereof, a disc secured to the driven shaft, an annular core carried by the disc within said annular casing, a helical vane surrounding said annular core and secured thereto terminating at its outer periphery adjacent the inner edge of the first helical vane, and a supply of liquid within said annular casing.

2. In a fluid coupling, a drive shaft, a driven shaft aligned with the drive shaft, a hollow circular annular casing secured to the drive shaft so as to rotate therewith, a helical vane within the casing and carried thereby, a disc secured to the driven shaft, spokes carried by the outer periphery of said disc, an annular core carried by the spokes within said annular casing, and a helical vane having a pitch reversed with respect to the first vane carried by said core.

3. In a fluid coupling, a drive shaft and an aligned driven shaft, an annular casing carried by the drive shaft, a helical vane within the casing secured to the casing, a second helical vane within the casing and within the first vane, a disc including spokes carried by the driven shaft, an annular core carried by said spokes supporting the second vane, and means providing a fluid passage through one of said spokes and said disc for introducing liquid into said casing and withdrawing liquid therefrom.

4. In a fluid coupling, a drive shaft, a driven shaft aligned with the drive shaft, an annular casing driven by the drive shaft and rotatable about the driven shaft, a plurality of helical vanes within said casing arranged along the inner wall thereof, a disc including spokes secured to the driven shaft, an annular core carried by said spokes within said annular casing, a helical vane supported on said annular core with the outer periphery adjacent the inner edges of the first helical vanes, said helical vane having a pitch reversed with respect to the pitch of the vanes carried by said casing, said disc and said driven shaft having a passage therein, a cylinder carried by the driven shaft communicating with said passage, a piston movable in said cylinder, a supply of liquid in said cylinder, and means responsive to variations in the speed of the driven shaft for moving said piston to move liquid therefrom into said casing through said passage and to withdraw liquid from the casing into said cylinder.

ESTYLE D. HANSON.

REFERENCES CITED

The following references are of record in the file of this patent:

UNITED STATES PATENTS

| Number | Name | Date |
|---|---|---|
| 2,154,882 | Yoxall | Apr. 18, 1939 |
| 2,293,766 | Salerni | Apr. 25, 1942 |
| 2,397,862 | Jencick | Apr. 2, 1946 |
| 2,408,497 | Weaner | Oct. 1, 1946 |

FOREIGN PATENTS

| Number | Country | Date |
|---|---|---|
| 9,943 | Great Britain | 1902 |